US007635400B2

(12) United States Patent
Yoo

(10) Patent No.: US 7,635,400 B2
(45) Date of Patent: Dec. 22, 2009

(54) DUST COLLECTING DEVICE FOR VACUUM CLEANER

(75) Inventor: Dong-hun Yoo, Gwangju (KR)

(73) Assignee: Samsung Gwangji Electronics Co., Ltd., Gwangji (KR)

( * ) Notice: Subject to any disclaimer, the term of this patent is extended or adjusted under 35 U.S.C. 154(b) by 550 days.

(21) Appl. No.: 11/479,589

(22) Filed: Jun. 30, 2006

(65) Prior Publication Data
US 2007/0084161 A1 Apr. 19, 2007

(30) Foreign Application Priority Data
Oct. 14, 2005 (KR) .................. 10-2005-0097149

(51) Int. Cl.
B01D 45/12 (2006.01)
(52) U.S. Cl. .............. 55/345; 55/337; 55/426; 55/428; 55/DIG. 3; 15/353
(58) Field of Classification Search ............ 55/456, 55/457, 343–349, 337, 426, 428–429, 459.1, 55/459.2, DIG. 3; 15/353
See application file for complete search history.

(56) References Cited
U.S. PATENT DOCUMENTS
7,014,671 B2 * 3/2006 Oh .......................... 55/337

| 2004/0231305 | A1 | 11/2004 | Oh ....................... 55/345 |
| 2006/0117723 | A1* | 6/2006 | Yoo ....................... 55/428 |
| 2006/0156699 | A1* | 7/2006 | Kim ....................... 55/345 |
| 2007/0214754 | A1* | 9/2007 | Kim ....................... 55/345 |

FOREIGN PATENT DOCUMENTS
WO 0074548 12/2000

OTHER PUBLICATIONS
British Combined Search and Examination Report dated Oct. 18, 2006 issued in connection with British Patent Application No. 0613879.9 filed on Jul. 12, 2006.
Office Action dated Nov. 7, 2008 corresponding to Chinese Patent Application No. 200610108333.1.

* cited by examiner

Primary Examiner—Duane Smith
Assistant Examiner—Dung Bui
(74) Attorney, Agent, or Firm—Ohlandt, Greeley, Ruggiero & Perle, L.L.P.

(57) ABSTRACT

A dust collecting device of a vacuum cleaner includes a first cyclone unit comprising a first cyclone chamber where the air enters through a first inlet and spins, and a first dust collecting chamber where dust separated from the air is collected; and a second cyclone unit comprising a second cyclone chamber where the air, discharged from the first cyclone unit, enters through a second inlet and spins, and one or more dust collecting parts formed on a circumference of a second cyclone body to separate minute dust from the air upon contacting with the air spinning within the second cyclone chamber. Accordingly, efficiency in collecting minute dust by the dust collecting device increases.

20 Claims, 7 Drawing Sheets

DUST COLLECTING DEVICE FOR VACUUM CLEANER

CROSS-REFERENCE TO RELATED APPLICATIONS

This application claims the benefit of Korean Patent Application No. 2005-97149, filed Oct. 14, 2005, in the Korean Intellectual Property Office, the disclosure of which is incorporated herein by reference.

BACKGROUND OF THE INVENTION

1. Field of the Invention

The present invention relates to a vacuum cleaner. More particularly, the present invention relates to a dust collecting device of a vacuum cleaner, which separates dust from externally-drawn air and accommodates the separated dust therein.

2. Description of the Related Art

General operation of a vacuum cleaner includes drawing in external air and dust, and separating the dust from the drawn air. The vacuum cleaner employs a dust collecting device to separate the dust and accommodate the separated dust. A cyclone dust collector, which separates dusts from the air by using centrifugal force, is quite popular among the dust collecting devices. Unlike the existing dust bags, the cyclone dust collector can be used repeatedly, and it provides more hygienic environment.

Although a cyclone dust collector is effective in separating large particles of dust from the air, the structural limit of the cyclone dust collector generates a problem of re-scattering and discharging of usually small particles of the collected dust to the outside.

A filter for fine dust has been used in a vacuum cleaner to prevent the above problem by re-filtering air and blocking fine particles of dust. However, as the vacuum cleaner additionally employs the filter for fine dust, structure is complicated, and because users have to use the filter as a separate part from the cyclone dust collector, maintenance of the vacuum cleaner is inconvenient.

SUMMARY OF THE INVENTION

Accordingly, the present general inventive concept has been made to solve the above-mentioned and/or problems, and an aspect of the present general inventive concept is to provide an improved dust collecting device of a vacuum cleaner, which is capable of improving fine dust collecting efficiency and simplifying the structure of vacuum cleaner.

It is another aspect of the present invention to provide an improved dust collecting device of a vacuum cleaner, capable of improving fine dust collecting efficiency and providing convenient maintenance.

The above aspects and/or other features of the present invention can substantially be achieved by providing a dust collecting device of a vacuum cleaner, which is mounted to a body of the vacuum cleaner and separates dust from an externally drawn air by using centrifugal force. The dust collecting device includes a first cyclone unit comprising a first cyclone chamber where the air enters through a first inlet and spins, and a first dust collecting chamber where dust separated from the air is collected; and a second cyclone unit comprising a second cyclone chamber where the air, discharged from the first cyclone unit, enters through a second inlet and spins, and one or more dust collecting parts formed on a circumference of a second cyclone body to separate minute dust from the air upon contacting with the air spinning within the second cyclone chamber.

The dust collecting parts comprise a second dust collecting chamber formed within a pocket which comprises an outerwadly-protruding part of the sidewall of the second cyclone body, the second cyclone body housing the second cyclone chamber therewithin; and a screen comprising one or more dust passing holes to let minute dust, which is separated from the air spinning in the second cyclone chamber, into the second dust collecting chamber, the screen blocking between the second dust collecting chamber and the second cyclone chamber.

One side of the screen facing the second cyclone chamber may be at the same plane as the inner circumference of the neighboring second cyclone body so as not to generate any difference of height.

The screen may have a plurality of the dust passing holes formed in a manner such that an area for passing the minute dust gradually decreases as farther away from the second inlet, and each of the dust passing holes may have an inlet facing the second cyclone chamber and an outlet being smaller than the inlet and facing the second dust collecting chamber.

Inner circumference of the dust passing hole may be inclined with respect to the radial direction of the second cyclone chamber such that the advancing direction of the minute dust passing through the dust passing holes is at an acute angle with the spinning direction of the air.

The second cyclone unit may further comprise a second cover for opening and closing both of openable upper ends of the second cyclone body and the pocket.

The screen may be removably disposed on an entrance part of the pocket.

The second cyclone unit may further comprise a second air discharge tube formed within the second cyclone body in fluid communication with a second outlet formed in the bottom of the second cyclone body, and a grill formed at an upper inlet of the second air discharge tube, and the second outlet may be penetrated in a lower sidewall of the second cyclone body such that the air drawn into the second cyclone body through the second outlet ascends toward the grill in a spinning current.

The second cyclone body may be connected to an end of a connecting tube which penetrates the sidewall of the first cyclone body such that the second cyclone body is exposed outside of a vacuum cleaner body upon mounting. The first cyclone body may comprise an air discharge port for guiding the air from the second cyclone unit into the vacuum cleaner body. A first passage may be provided, with being connected with a first outlet which guides the air being discharged from the second inlet and the first cyclone unit, and a second passage may be provided, with being connected with a second outlet which guides the air being discharged from the air discharge port and the second cyclone chamber. The first and the second passages may be formed within the connecting tube and isolated from each other.

The first cyclone unit may comprise an air inlet tube connected to a lower sidewall of the first cyclone body and forming the first inlet; and a cyclone receptacle arranged within the first cyclone body, formed in a cylindrical configuration with an open upper end, and connected at a lower sidewall to the first inlet. The first cyclone chamber may be formed within the cyclone receptacle, and the first dust collecting chamber may be formed between an outer wall of the first cyclone receptacle and an inner wall of the first cyclone body.

The first cyclone body may be formed in a cylindrical configuration with an open upper end, the first cyclone unit may further comprise a first cover openably covering the open upper end of the first cyclone body, and the open upper end of the cyclone receptacle and the first cover may be arranged at a predetermined distance away from each other to form a first dust discharge port through which the dust, which is separated from the ascending, spinning air inside the first cyclone chamber by the centrifugal force, is drawn into the first dust collecting chamber.

The first cyclone unit may further comprise a first air discharge tube in fluid communication with the first outlet, and the first air discharge tube may be arranged within the cyclone receptacle such that the open upper end of the first air discharge tube is positioned on an inner upper end of the cyclone receptacle.

The vacuum cleaner may comprise a mount where the first cyclone unit is seated, a suction passage for guiding the externally-drawn air of the vacuum cleaner body to the mount, and a discharge passage for guiding the air discharged from the mount to the outside of the vacuum cleaner body, and the outlet of the suction passage formed within the mount may be connectible with the first inlet in parallel direction with respect to the mounting direction of the first cyclone body.

The vacuum cleaner body may further comprise an operating lever which is turnably engaged with an upper wall of the mount, and the operating lever may comprise an external lever exposed outside the vacuum cleaner body for turning operation by a user, and one or more first guide cams formed to face the first cover. The first cover may comprise a hook protruding from the upper surface of the first cover to hook in a first hole formed in the operating lever, a fixing protrusion protruding from the upper surface of the first cover to pass through the first hole and inserted in a hole formed in an upper wall of the mount so as to restraint the first cover from turning when the operating lever turns, and one or more second guide cams corresponding to the guide cam of the operating lever to raise and lower the first cover according to the turning movement of the operating lever, such that the first cover ascends and descends according to the turning operation of the operating lever to selectively open the upper end of the first cyclone body.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
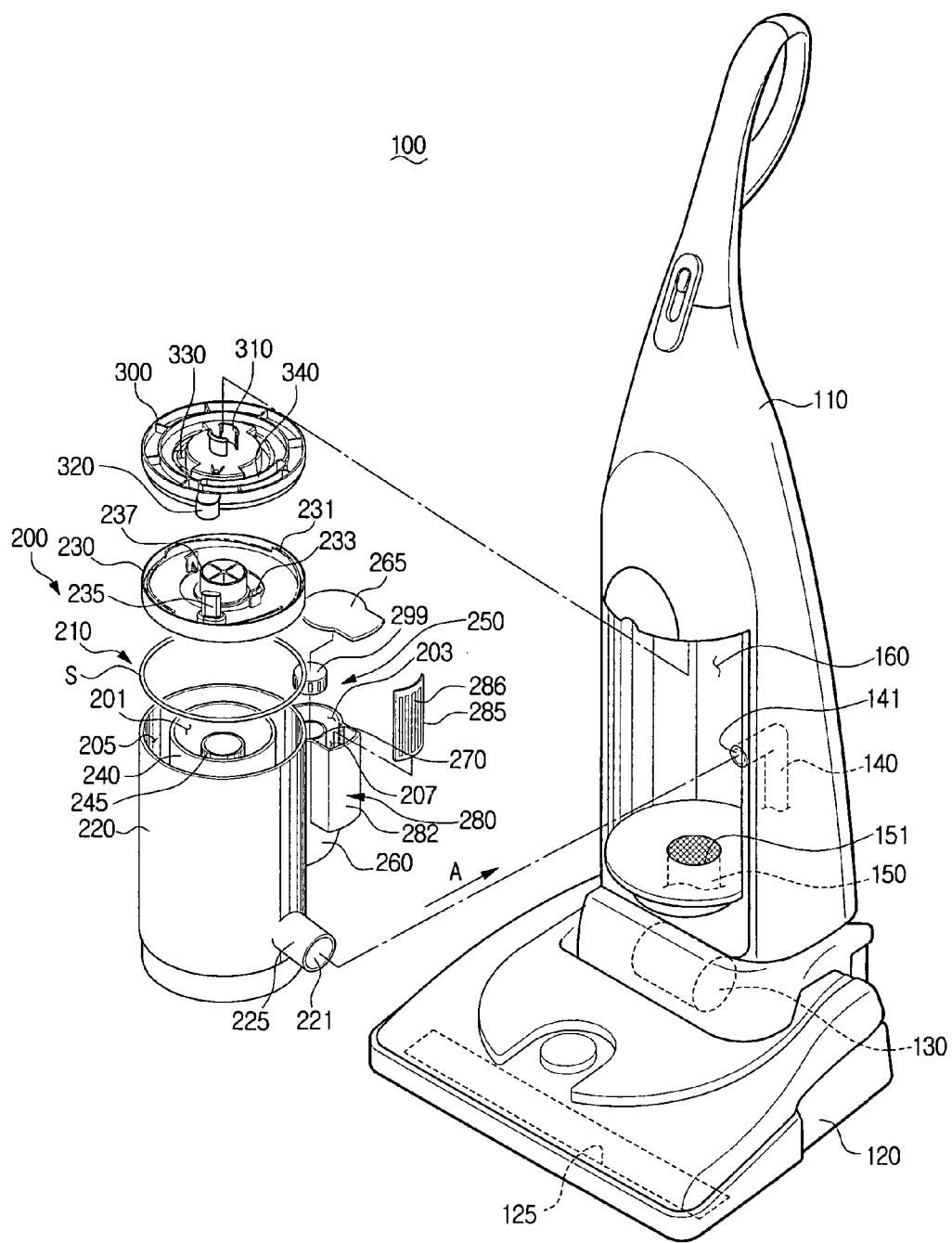
FIG. 1 is a perspective view of a vacuum cleaner, showing a dust collecting device according to an embodiment of the present invention in disassembled state.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
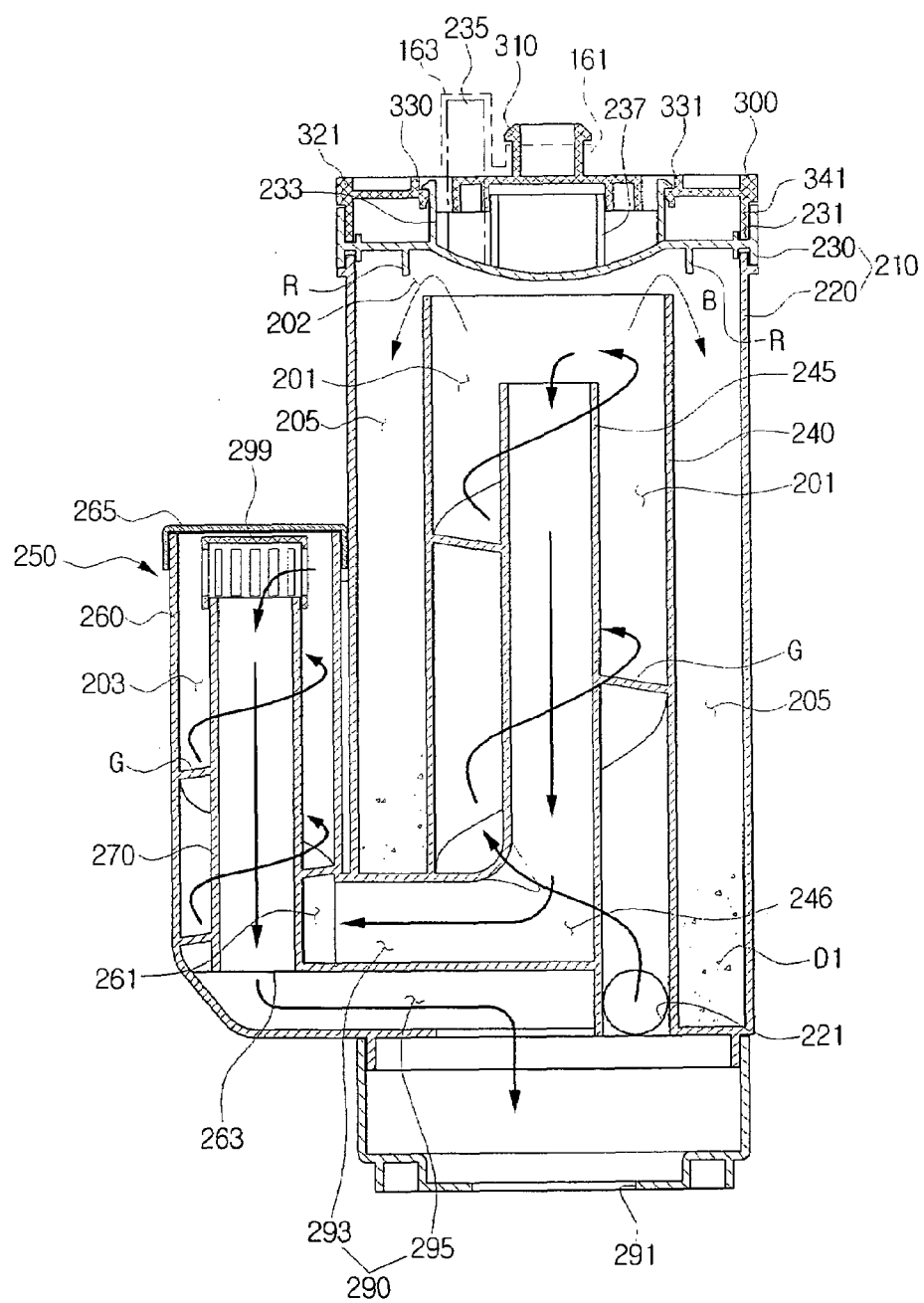
FIG. 2 shows in section a dust collecting device in operation according to an embodiment of the present invention.

FIG. 1 shows a vacuum cleaner employing a cyclone dust collecting device according to an embodiment of the present invention, and FIG. 2 shows in section a cyclone dust collecting device according to an embodiment of the present invention.

Referring to FIGS. 1 and 2, a vacuum cleaner 100 according to an embodiment of the present invention includes a cleaner body 110, and a cyclone dust collecting device 200.

The cleaner body 110 includes a suction motor 130, a suction port assembly 120, a mount 160, a suction path 140 and a discharge path 150. The suction port assembly 120 includes a dust suction port 125 through which air and dust of a surface being cleaned is drawn by the suction force of the suction motor 130. Accordingly, air and dust is drawn through the dust suction port 125 and guided into the mount 160 via the suction path 140. The mount 160 is provided to the cleaner body 110 to mount the cyclone dust collecting device 200 and an operating lever 300 which will be described in detail below.

The cyclone dust collecting device 200 separates dust from the air incoming through the suction path 140 by using centrifugal force, and includes a first cyclone unit 210, and a second cyclone unit 250. A guide member G is provided to the first and the second cyclone units 210, 250 to guide the air of first and the second cyclone chambers 201, 203 to spin.

The first cyclone unit 210 separates dust from the air drawn through the suction path 140, and includes a first cyclone body 220, a cyclone receptacle 240, a first cover 230, an air inlet tube 225, an air outlet 291, a connecting tube 290, and a first air discharge tube 245. A sealing member S is provided to seal a connecting part between the first cyclone body 220 and the first cover 230 (see FIG. 1).

The first cyclone body 220 is detachably supported on the mount 160, and has the air inlet tube 225 and outlet 291 on the outer circumference thereof. The first cyclone body 220 has a cylindrical shape with an openable upper end. The upper end of the first cyclone body 220 can be selectively opened and closed by the first cover 230. The air outlet 291 in this embodiment is formed on the lower end of the first cyclone body 220 such that the air outlet 291 fluidly communicates with the gate 151 of the discharge path 150 upon mounting of the cleaner body 110 with respect to the mount 160. The discharge path 150 is penetratingly formed in the bottom of the mount 160.

The cyclone receptacle 240 is formed in a cylindrical shape with an open upper end. The cyclone receptacle 240 is formed within the first cyclone body 220 at the center. The cyclone receptacle 240 is positioned such that the upper end is lower than the upper end of the first cyclone body 220, and lower part of the sidewall is fluidly communicated with the air inlet tube 225 formed in the lower end of the sidewall of the first cyclone body 220. When the first cover 230 is mounted to the upper end of the first cyclone body 220, the lower side of the first cover 230 and the upper end of the cyclone receptacle 240 are positioned at a predetermined gap from each other. The interior of the cyclone receptacle 240 defines the first cyclone chamber 201 where the air drawn through the air inlet tube 225 ascends in a spinning current, and the gap between the cyclone receptacle 240 and the first cover 230 defines a dust discharge port 202 through which the dust shed from the spinning air by the centrifugal force is discharged out of the first cyclone chamber 201 in the direction of arrow B of FIG. 2. A first dust collecting chamber 205 is formed between the cyclone receptacle 240 and the first cyclone body 220 to receive dust as discharged above. Additionally, a backflow prevention member R may be provided to prevent the dust from flowing back into the first cyclone chamber 201 as it is discharged through the dust discharge port 202.

With the first cyclone unit 210 constructed as above, air is drawn via the suction path 140 and the air inlet tube 225, and introduced into the first cyclone unit 210. The air then ascends in a whirling or spinning (hereinafter "spinning") current in the first cyclone chamber 201, passes the open upper end of the first air discharge tube 245 protruding from the center of the cyclone receptacle 240, and is discharged out of the first cyclone unit 210. In this process, dust is shed out of the spinning air current by the centrifugal force, discharged through the dust discharge port 202 and collected in the first dust collecting chamber 205. In the above-explained structure, the first dust collecting chamber 205 and the first cyclone chamber 201 are independently formed in the first cyclone unit 210. Thus, dust does not flow back into the cyclone receptacle 240 even when it is moved to one side of the first cyclone body 220 due to inclining of the vacuum cleaner 100.

The second cyclone unit 250 re-filters dust D2 (FIG. 3) from the air which is discharged out of the first cyclone unit 210. In this process, dust D2, which is smaller than the dust D1 separated in the first cyclone unit, is separated from the air. To this end, the second cyclone unit 250 is fluidly communicated with the first cyclone unit 210 through the connecting tube 290, which is penetratingly formed in a sidewall of the first cyclone body 220. The second cyclone unit 250 includes a second cyclone body 260, a second air discharge tube 270, a second cover 265, and a dust collecting part 280.

The second cyclone body 260 has a cylindrical shape, which is connected with the first cyclone body 220 through the connecting tube 290. The upper end of the second cyclone body 260 is selectively openable by the second cover 265. A second gate 261 guides the drawn air to the second cyclone body 260, and is connected with a first exit 246 of the first air discharge tube 245 through a first passage 293 defined within the connecting tube 290. According to the embodiment of the present invention, the second cyclone body 260 is connected with the first cyclone body 220 such that when mounted on the mount 160, the second cyclone body 260 is exposed to the outside of the cleaner body 110. User can easily check the status inside the second cyclone unit 250, and the second cyclone body 260 can be cleaned together with the first cyclone body 220. Therefore, convenience in the maintenance of the second cyclone unit 250 is provided. Additionally, because the second cyclone unit 250 is not formed within the cleaner body 110 or the first cyclone unit 210, complicated structure can be avoided.

The second air discharge tube 270 protrudes upward from the center of the bottom of the second cyclone body 260, with its upper end open and enclosed by a separate, removable grill 299. A second exit 263 formed on the lower end is connected with the air outlet 291 at the lower end of the first cyclone body 220, through a second passage 295, which is formed at the connecting tube 290. There is a second cyclone chamber 203 defined between the second cyclone body 260 and the second air discharge tube 270 such that the drawn air guided into the second cyclone body 260 through the first passage 293 spins in the second cyclone chamber 203.

Figure 3:
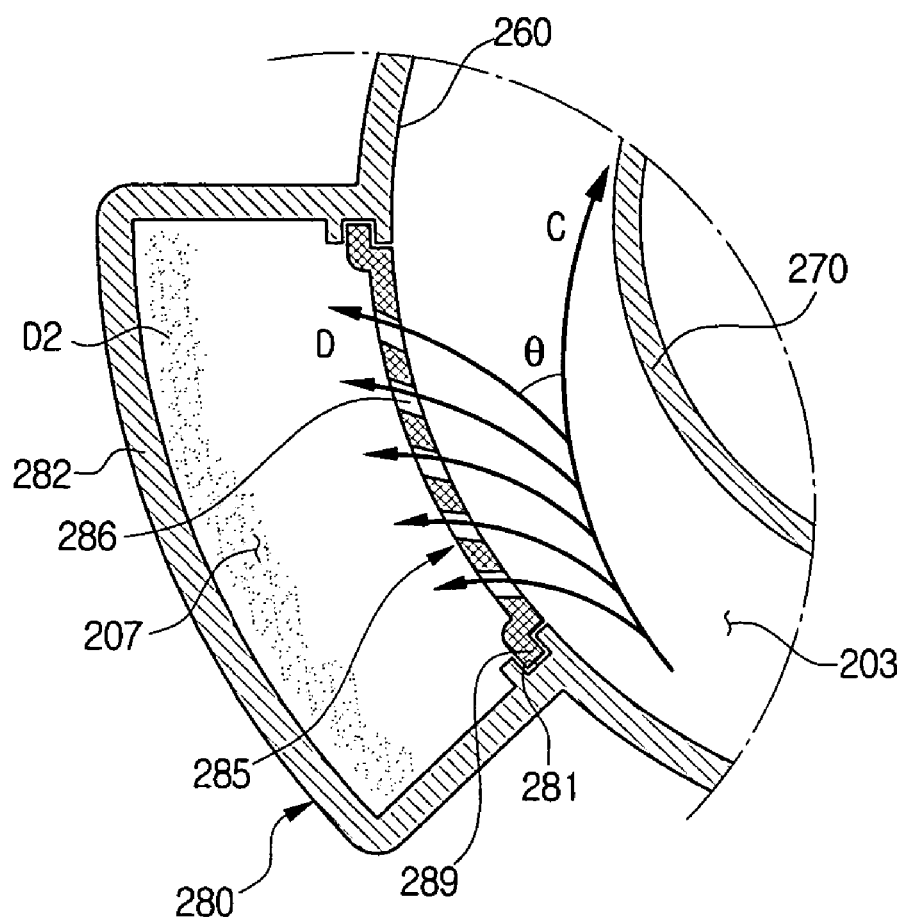
FIG. 3 shows a second cyclone unit in operation according to a first exemplary embodiment of the present invention.

With reference to FIGS. 2 and 3, minute dust D2 are separated from the drawn air by contact with the dust collecting part 280 until the drawn air spinning within the second cyclone chamber 203 reaches the grill 299. Because minute dust D2 are first separated by the dust collecting part 280 from the air of the second cyclone unit 250, clogging of the grill 299 by the minute dust D2 can be avoided. As a result, deterioration of suction force of the vacuum cleaner 100 and damage due to the overheating of the suction motor 130 can be prevented. Additionally, efficiency of the cyclone dust collecting device 200 increases in collecting minute dust D2. The dust collecting part 280 includes a pocket 282 and a screen 285.

The pocket 282 includes a part of the second cyclone body 260 which protrudes to the outside of the second cyclone unit 250, and has a second dust collecting chamber 207 defined therewithin. For the convenience of the maintenance, the grill 299 and the second dust collecting chamber 207 are formed such that both can be cleaned at the same time. To this end, the pocket 282 has an open upper end, and the open upper end is made openable by the second cover 265 together with the upper end of the second cyclone body 260.

The screen 285 is removably interposed between the second dust collecting chamber 207 and the second cyclone chamber 203 to block one from the other. To this end, the screen 285 includes a slidable protrusion 289 which is slidably engageable with a mount groove 281 formed in the second cyclone body 260. Additionally, the screen 285 has one or more dust passing holes 286 for the minute dust to enter into the second dust collecting chamber 207 instead of escaping to the outside by the centrifugal force of the spinning air of the second cyclone chamber 203. The dust passing holes 286 may be formed in a slit pattern as shown in FIG. 1 to further enhance minute dust separating efficiency. More specifically, the dust passing holes 286 have inclined inner circumference as shown in FIG. 3 such that the forward direction C of the spinning air of the second cyclone chamber 203 can be at an acute angle with respect to the forward direction D of the minute dust D2 moving toward the second dust collecting chamber 207. The screen 285 may be arranged on the same plane as the inner circumference of the second cyclone body 260 so as not to form a height difference between one side of the second cyclone chamber 203 and the inner circumference of the second cyclone body 260, and so as to increase the minute dust collecting efficiency and control loss of current within the second cyclone chamber 203. This particular embodiment depicts a cylindrical cyclone body 260, and accordingly, the screen 285 has the same radius of curvature as the inner circumference of the second cyclone body 260 to satisfy the above-mentioned conditions.

Figure 4:
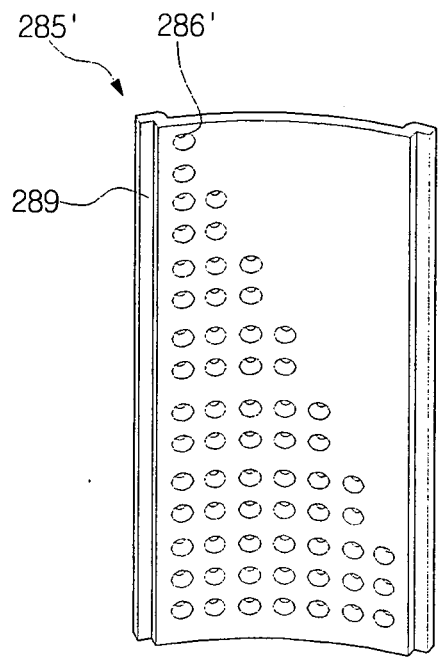
FIG. 4 is a perspective view of a screen according to a second exemplary embodiment of the present invention.
Figure 5:
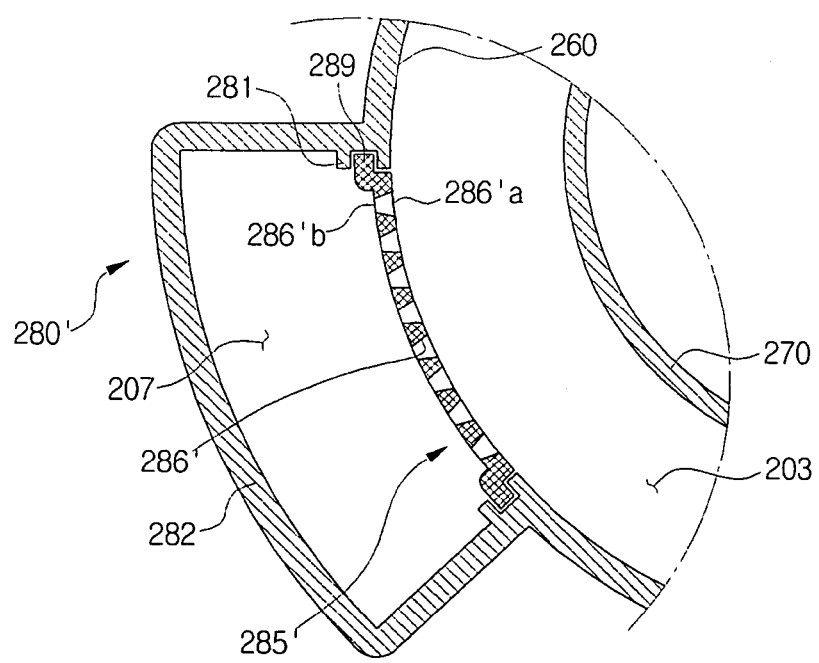
FIG. 5 shows the main part of a second cyclone unit with the screen of FIG. 4 being attached according to the second exemplary embodiment of the present invention.

One will appreciate that the above embodiment will not be construed as limiting, and therefore, the screen 285 can be constructed according to other adequate configurations. For example, FIGS. 4 and 5 shows a screen 285' according to another embodiment of the present invention, which has conical dust passing holes 286'. In this embodiment, the number of dust passing holes 286' may be adjusted appropriately so that the area for passing the dust can gradually decrease as farther away from the second gate 261. In this particular embodiment where the second gate 261 is arranged at the lower part inside of the second cyclone chamber 203, the number of dust passing holes 286' gradually decreases toward the upper part of the screen 285'. Accordingly, the minute dust separated by the dust passing holes 286' can be effectively prevented from leaking out of the second dust collecting chamber 207 and flowing toward the grill 299. As shown in the embodiment of FIG. 5, each of the dust passing holes 286' has an inlet 286'$a$ facing the second cyclone chamber 203 and an outlet 286'$b$ facing the second dust collecting chamber 207. Because the outlets 286'$b$ are narrower than the inlets 286'$a$, leakage of minute dust can be more efficiently prevented.

Although not shown, the pocket 282 may be formed in a variety of configurations. For example, the pocket 282 may be removably disposed on a passing hole (not shown) which is formed in a side of the second cyclone body 260.

Figure 6:
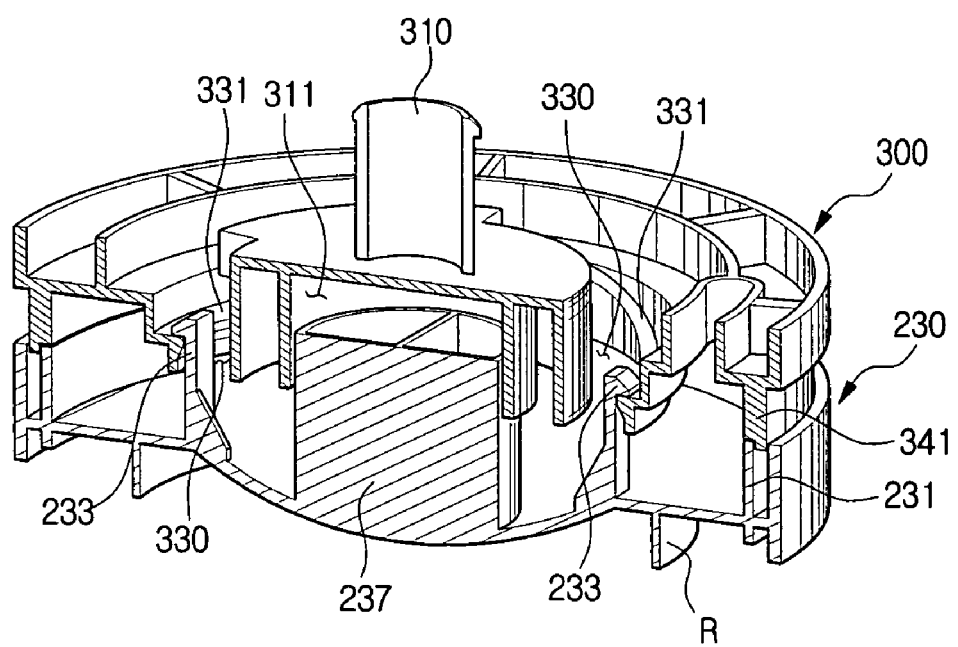
FIG. 6 shows a fixing unit in fixed state according to a third exemplary embodiment of the present invention.

Meanwhile, for more efficient mounting of the cyclone dust collecting device 200 and for simpler structure of the cleaner body 110, the first cyclone body 220 may be constructed to fasten to the mount 160 according to the ascend and descend of the first cover 230. To this end, the vacuum cleaner according to one embodiment of the present invention may include an operating lever 300, a hook 233 and guide cams 341, 231, 331 (FIGS. 1, 2 and 6).

The operating lever 300 is turnable about an axis 310 which is engaged with a first fixing hole 161 (FIG. 2) on the upper wall of the mount 160. The operating lever 300 has an operating part 320 protruding on its outer circumference for the turning operation of the operating lever 300 by the users.

The hook 233 protrudes from the upper surface of the first cover 230, and is hooked with the upper end of the third guide cam 331 through the first passing hole 330 of the operating lever 300. A guide protrusion 237 is inserted in a guide groove 311 which is formed in the lower surface of the operating lever 300 and accordingly guides the engagement of the first cover 230 and the operating lever 300. There is a fixing protrusion 235 protruding from the upper surface of the first cover 230. Upon engagement of the first cover 230 with the operating lever 300, the fixing protrusion is passed through the second passing hole 340 of the operating lever 300 and engaged with the second fixing hole 163 (FIG. 2) in the upper wall of the mount 160. By the second fixing hole 163 and the fixing protrusion 235, the first cover 230 is prevented from turning when the first cover 230 turns.

The guide cams 341, 231, 331 operate to raise and lower the first cover 230 according to the turning of the operating lever 300. In this particular embodiment, the guide cams 341, 231, 331 include first and third guide cams 341, 331 formed on the operating lever 300, and a second guide cam 231 formed on the upper surface of the first cover 230. The first and the second guide cams 341, 231 are formed to face each other upon engagement of the first cover 230 with the operating lever 300, and the third guide cam 331 has the same inclination angle as that of the first guide cam 341 with respect to the outer circumference of the first passing hole 330 in contact with the upper end of the hook 233, upon engagement of the hook 233 with the first passing hole 300.

The process of mounting the cyclone dust collecting device 200 according to the above-explained embodiments of the present invention will be described below.

Figure 7:
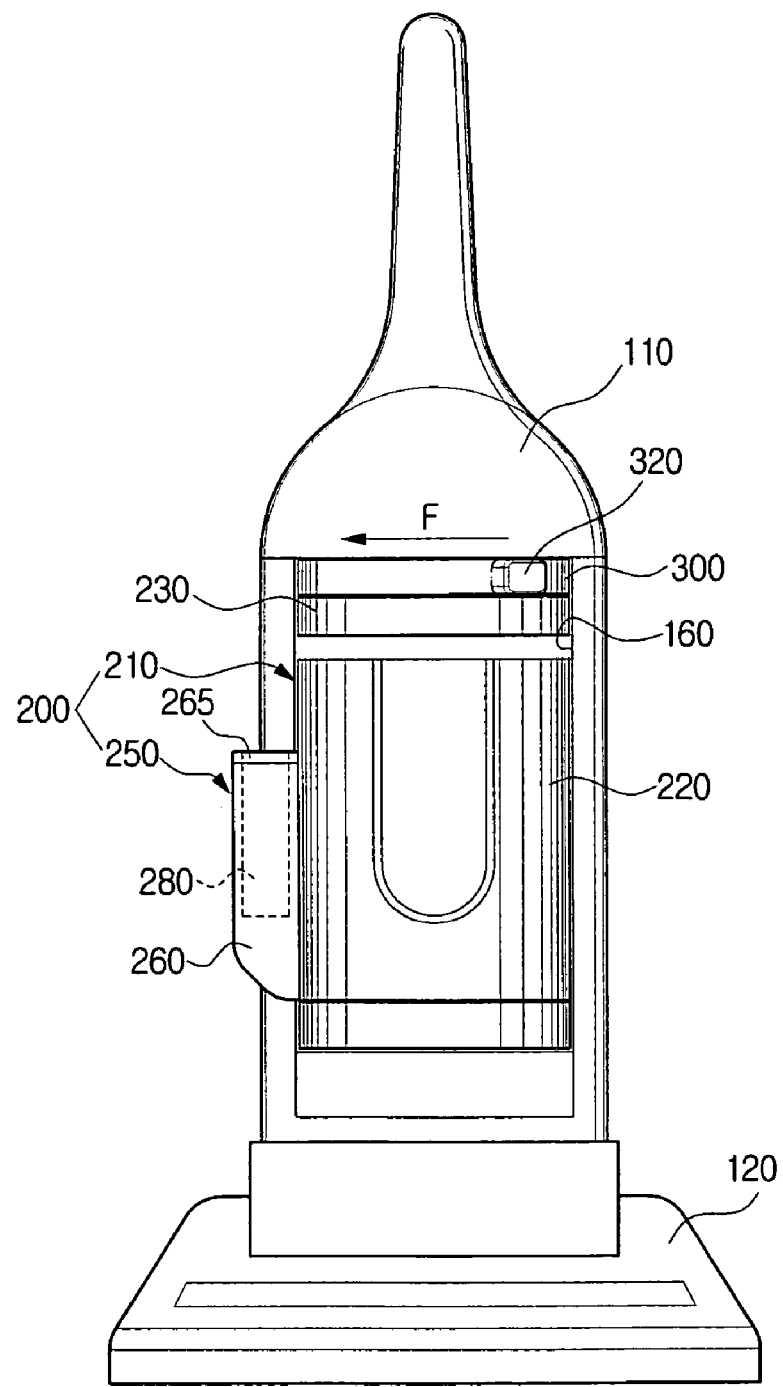
FIGS. 7 and 8 sequentially show the mounting of a dust collecting device according to the third exemplary embodiment of the present invention.

In the state that the first cover 230 is mounted together with the operating lever 300 on the upper wall of the mount 160, the first cyclone body 220 is inserted in the mount 160 along the direction of arrow A of FIG. 1. The first cyclone body 220 is inserted in a manner such that the first inlet 221 of the air inlet tube 225 integrally formed on the sidewall of the first cyclone body 220 is connected with the outlet 141 of the suction path 140 which is formed within the mount 160. FIG. 7 shows the cyclone dust collecting device 200 mounted with the first cyclone body 220 is finished.

Figure 8:
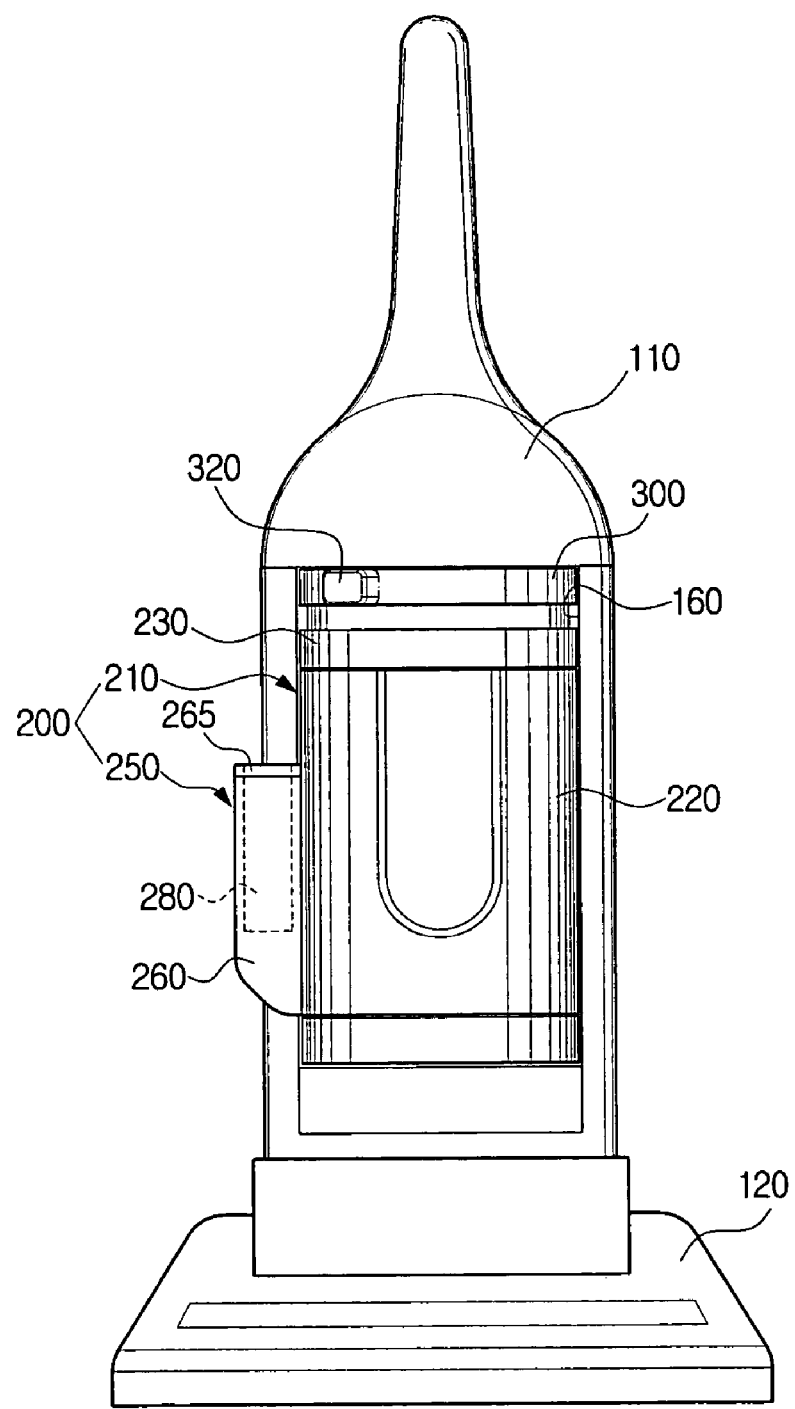

When the first cyclone body 220 is mounted, the operating part 320 is operated to turn the operating lever 300 to a predetermined direction F (FIG. 7). According to the turning movement of the operating lever 300, the first cover 230 descends by the first, second and third guide cams 341, 231, 331. According to the descending of the first cover 230, as shown in FIG. 8, the lower end of the first cover 230 is engaged with the upper end of the first cyclone body 220, causing the air outlet 291 at the lower end of the first cyclone body 220 to tightly contact the inlet of the discharge path 150. The first cyclone body 220 is dismounted in the reverse order, and detailed description thereof will be omitted for the sake of brevity.

According to one aspect of the present invention, dust are separated from the drawn air by multi-stages, increasing efficiency in dust separation.

Additionally, because the second cyclone unit 210 for separating the dust from the drawn air is integrally formed with the first cyclone unit 220, maintenance works such as emptying the collected dust can be performed at the same time for the first and the second cyclone units 220, 220. Therefore, upkeep of the dust collecting device becomes simpler.

Additionally, the second cyclone unit 210 additionally includes a dust collecting part and prevents clogging of the grill 299 in advance. As a result, suction efficiency of the vacuum cleaner increases and deterioration of cleaning efficiency of the cyclone dust collecting device 200 is prevented.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A dust collecting device of for mounting to a body of a vacuum cleaner to separate dust from an externally drawn air by using centrifugal force, the dust collecting device comprising:
    a first cyclone unit comprising a first cyclone chamber where the externally drawn air enters through a first inlet and spins, and a first dust collecting chamber where dust separated from the externally drawn air is collected; and
    a second cyclone unit comprising a second cyclone chamber where air, discharged from the first cyclone unit, enters through a second inlet and spins, and one or more dust collecting parts formed on a circumference of a second cyclone body to separate minute dust from the air upon contacting with the air spinning within the second cyclone chamber.

2. The dust collecting device of claim 1, wherein the one or more dust collecting parts comprise:
    a second dust collecting chamber formed within a pocket which comprises an outerwadly-protruding part of the sidewall of the second cyclone body, the second cyclone body housing the second cyclone chamber therewithin; and
    a screen comprising one or more dust passing holes to let minute dust, which is separated from the air spinning in the second cyclone chamber, into the second dust collecting chamber, the screen blocking between the second dust collecting chamber and the second cyclone chamber.

3. The dust collecting device of claim 2, wherein one side of the screen facing the second cyclone chamber is at the same plane as an inner circumference of the second cyclone body so as not to generate any difference of height.

4. The dust collecting device of claim 2, wherein one or more dust passing holes comprise a plurality of the dust passing holes formed in a manner such that an area for passing the minute dust gradually decreases as farther away from the second inlet, and
each of the plurality of dust passing holes has an inlet facing the second cyclone chamber and an outlet being smaller than the inlet and facing the second dust collecting chamber.

5. The dust collecting device of claim 2, wherein the one or more dust passing holes comprise an inner circumference that is inclined with respect to a radial direction of the second cyclone chamber such that an advancing direction of the minute dust passing through the one or more dust passing holes is at an acute angle with a spinning direction of the air.

6. The dust collecting device of claim 2, wherein the second cyclone unit further comprises a second cover for opening and closing openable upper ends of both of the second cyclone body and the pocket.

7. The dust collecting device of claim 2, wherein the screen is removably disposed on an entrance part of the pocket.

8. The dust collecting device of claim 7, wherein the second cyclone unit further comprises a second air discharge tube formed within the second cyclone body in fluid communication with a second outlet formed in the bottom of the second cyclone body, and a grill formed at an upper inlet of the second air discharge tube, and
the second outlet penetrates a lower sidewall of the second cyclone body such that the air drawn into the second cyclone body through the second outlet ascends toward the grill in a spinning current.

9. The dust collecting device of claim 8, wherein the second cyclone body is connected to an end of a connecting tube that penetrates the sidewall of the first cyclone body such that the second cyclone body is exposed outside of the body of the vacuum cleaner upon mounting,
the first cyclone body comprises an air discharge port for guiding the air from the second cyclone unit into the vacuum cleaner body, and
a first passage is connected with a first outlet which guides the air being discharged from the second inlet and the first cyclone unit, and a second passage is connected with a second outlet which guides the air being discharged from the air discharge port and the second cyclone chamber, and the first and the second passages are formed within the connecting tube and isolated from each other.

10. The dust collecting device of claim 9, wherein the first cyclone unit comprises:
an air inlet tube connected to a lower sidewall of the first cyclone body and forming the first inlet; and
a cyclone receptacle arranged within the first cyclone body, formed in a cylindrical configuration with an open upper end, and connected at a lower sidewall to the first inlet, and
the first cyclone chamber is formed within the cyclone receptacle, and the first dust collecting chamber is formed between an outer wall of the first cyclone receptacle and an inner wall of the first cyclone body.

11. The dust collecting device of claim 10, wherein the first cyclone body is formed in a cylindrical configuration with an open upper end,
the first cyclone unit further comprises a first cover openably covering the open upper end of the first cyclone body, and the open upper end of the cyclone receptacle and the first cover are arranged at a predetermined distance away from each other to form a first dust discharge port through which the dust, which is separated from the ascending, spinning air inside the first cyclone chamber by the centrifugal force, is drawn into the first dust collecting chamber.

12. The dust collecting device of claim 11, wherein the first cyclone unit further comprises a first air discharge tube in fluid communication with the first outlet, and
the first air discharge tube is arranged within the cyclone receptacle such that the open upper end of the first air discharge tube is positioned on an inner upper end of the cyclone receptacle.

13. A vacuum cleaner comprising:
a first cyclone unit comprising a first cyclone chamber where externally drawn air enters through a first inlet and spins, and a first dust collecting chamber where dust separated from the externally drawn air is collected;
a second cyclone unit comprising a second cyclone chamber where air, discharged from the first cyclone unit, enters through a second inlet and spins, and one or more dust collecting parts formed on a circumference of a second cyclone body to separate minute dust from the air upon contacting with the air spinning within the second cyclone chamber, wherein the first and second cyclone units form a dust collecting device;
a vacuum cleaner body;
a mount where the first cyclone unit is seated, a suction passage for guiding the externally drawn air to the mount, and a discharge passage for guiding the air discharged from the mount to the outside of the vacuum cleaner body, wherein the suction passage has an outlet formed within the mount that is connectible with the first inlet in parallel direction with respect to the mounting direction of the first cyclone body.

14. The vacuum cleaner of claim 13, wherein the one or more dust collecting parts comprise:
a second dust collecting chamber formed within a pocket which comprises an outerwadly-protruding part of the sidewall of the second cyclone body, the second cyclone body housing the second cyclone chamber therewithin; and
a screen comprising one or more dust passing holes to let minute dust, which is separated from the air spinning in the second cyclone chamber, into the second dust collecting chamber, the screen blocking between the second dust collecting chamber and the second cyclone chamber.

15. The vacuum cleaner of claim 14, wherein the screen is removably disposed on an entrance part of the pocket.

16. The vacuum cleaner of claim 15, wherein the second cyclone unit further comprises a second air discharge tube formed within the second cyclone body in fluid communication with a second outlet formed in the bottom of the second cyclone body, and a grill formed at an upper inlet of the second air discharge tube, and
the second outlet penetrates a lower sidewall of the second cyclone body such that the air drawn into the second cyclone body through the second outlet ascends toward the grill in a spinning current.

17. The vacuum of claim 16, wherein the second cyclone body is connected to an end of a connecting tube that penetrates the sidewall of the first cyclone body such that the second cyclone body is exposed outside of the body of the vacuum cleaner upon mounting, the first cyclone body comprises an air discharge port for guiding the air from the second cyclone unit into the vacuum cleaner body, and a first passage is connected with a first outlet which guides the air being discharged from the second inlet and the first cyclone unit, and a second passage is connected with a second outlet which guides the air being discharged from the air discharge port and the second cyclone chamber, and the first and the second passages are formed within the connecting tube and isolated from each other.

18. The vacuum cleaner of claim 17, wherein the first cyclone unit comprises:

an air inlet tube connected to a lower sidewall of the first cyclone body and forming the first inlet; and a cyclone receptacle arranged within the first cyclone body, formed in a cylindrical configuration with an open upper end, and connected at a lower sidewall to the first inlet, and the first cyclone chamber is formed within the cyclone receptacle, and the first dust collecting chamber is formed between an outer wall of the first cyclone receptacle and an inner wall of the first cyclone body.

19. The vacuum cleaner of claim 18, wherein the first cyclone body is formed in a cylindrical configuration with an open upper end, the first cyclone unit further comprises a first cover openably covering the open upper end of the first cyclone body, and the open upper end of the cyclone receptacle and the first cover are arranged at a predetermined distance away from each other to form a first dust discharge port through which the dust, which is separated from the ascending, spinning air inside the first cyclone chamber by the centrifugal force, is drawn into the first dust collecting chamber.

20. The dust collecting device of claim 19, wherein the vacuum cleaner body further comprises an operating lever which is turnably engaged with an upper wall of the mount, and the operating lever comprises an external lever exposed outside the vacuum cleaner body for turning operation by a user, and one or more first guide cams formed to face the first cover, and the first cover comprises, a hook protruding from the upper surface of the first cover to hook in a first hole formed in the operating lever, a fixing protrusion protruding from the upper surface of the first cover to pass through the first hole and inserted in a hole formed in an upper wall of the mount so as to restraint the first cover from turning when the operating lever turns, and one or more second guide cams corresponding to the guide cam of the operating lever to raise and lower the first cover according to the turning movement of the operating lever, such that the first cover ascends and descends according to the turning operation of the operating lever to selectively open the upper end of the first cyclone body.

\* \* \* \* \*